US008561402B2

(12) United States Patent
Dunlap, III et al.

(10) Patent No.: US 8,561,402 B2
(45) Date of Patent: Oct. 22, 2013

(54) MASTER CYLINDER FOR A HYDRAULIC ACTUATION SYSTEM FOR A HANDLEBAR-STEERED VEHICLE

(75) Inventors: Charles Emmett Dunlap, III, Manitou Springs, CO (US); Braden Snead, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 627 days.

(21) Appl. No.: 12/912,180

(22) Filed: Oct. 26, 2010

(65) Prior Publication Data

US 2012/0096850 A1  Apr. 26, 2012

Related U.S. Application Data

(63) Continuation-in-part of application No. 12/390,937, filed on Feb. 23, 2009, now Pat. No. 8,046,996, which is a continuation-in-part of application No. 11/761,194, filed on Jun. 11, 2007, now Pat. No. 7,757,488.

(51) Int. Cl.
    *B60T 11/26* (2006.01)
(52) U.S. Cl.
    USPC ............................................. 60/588
(58) Field of Classification Search
    USPC ............... 60/574, 584, 585, 588; 417/489
    See application file for complete search history.

(56) References Cited

U.S. PATENT DOCUMENTS

| | | | |
|---|---|---|---|
| 6,003,639 A * | 12/1999 | Buckley et al. | 188/26 |
| 6,769,254 B2 | 8/2004 | Heller et al. | |
| 6,871,729 B2 | 3/2005 | Huster et al. | |
| 6,957,534 B2 | 10/2005 | Lumpkin | |
| 6,973,784 B2 | 12/2005 | Okuma | |
| 7,219,495 B2 | 5/2007 | Ludsteck et al. | |
| 2006/0213192 A1 | 9/2006 | Henifin | |
| 2008/0302101 A1 | 12/2008 | Dunlap, III | |
| 2009/0205330 A1 | 8/2009 | Dunlap, III | |

FOREIGN PATENT DOCUMENTS

GB          2141498          12/1984

\* cited by examiner

*Primary Examiner* — Edward Look
*Assistant Examiner* — Logan Kraft
(74) *Attorney, Agent, or Firm* — Milan Milosevic; Lisa Serdynski; Steven Courtright

(57) ABSTRACT

A master cylinder assembly for a hydraulic actuation system for a handlebar-steered vehicle. The master cylinder assembly generally includes a housing mountable to a frame member of the handlebar-steered vehicle and having a chamber including a fluid cavity with first and second fluid cavity regions. The first fluid cavity region is in fluid communication with the hydraulic actuation system. The housing includes discrete first and second housing portions. The first housing portion has first and second end portions. The first end portion of the first housing portion extends axially into the second fluid cavity region creating an annular gap radially outboard of the first end portion extending into the second fluid cavity region. The second end portion of the first housing portion is connected to the hydraulic actuation system. A piston assembly includes a piston slidably disposed within the fluid cavity. An actuator is operatively connected to the housing and operatively connected to the piston to slidably displace the piston between an open fluid circuit position permitting fluid flow between the first and second fluid cavity regions and a closed fluid circuit position blocking fluid flow between the first and second fluid cavity regions.

24 Claims, 5 Drawing Sheets

MASTER CYLINDER FOR A HYDRAULIC ACTUATION SYSTEM FOR A HANDLEBAR-STEERED VEHICLE

RELATED APPLICATION DATA

This application is a continuation-in-part of U.S. application Ser. No. 12/390,937 filed on Feb. 23, 2009, entitled "Master Cylinder for a Hydraulic Actuation System for a Handlebar-Steered Vehicle" which is a continuation-in-part of U.S. application Ser. No. 11/761,194 filed on Jun. 11, 2007, entitled "Master Cylinder for a Hydraulic Actuation System for a Handlebar-Steered Vehicle."

BACKGROUND OF THE INVENTION

The present invention relates to hydraulic actuation systems for handlebar-steered vehicles and more particularly to a master cylinder assembly for a hydraulic actuation system that reduces air bubbles in the pressurized fluid cavity.

SUMMARY OF THE INVENTION

The present invention provides a master cylinder assembly for a hydraulic actuation system for a handlebar-steered vehicle. The master cylinder assembly generally includes a housing mountable to a frame member of the handlebar-steered vehicle and having a chamber including a fluid cavity with first and second fluid cavity regions. The first fluid cavity region is in fluid communication with the hydraulic actuation system. The housing includes discrete first and second housing portions. The first housing portion has first and second end portions. The first end portion of the first housing portion extends axially into the second fluid cavity region creating an annular gap radially outboard of the first end portion extending into the second fluid cavity region. The second end portion of the first housing portion is connected to the hydraulic actuation system. The master cylinder assembly includes a piston assembly including a piston slidably disposed within the fluid cavity and an actuator. The actuator is operatively connected to the housing and operatively connected to the piston to slidably displace the piston between an open fluid circuit position permitting fluid flow between the first and second fluid cavity regions and a closed fluid circuit position blocking fluid flow between the first and second fluid cavity regions. In one embodiment, the actuator is a lever pivotably attached to the housing and the frame member is a handlebar.

In one embodiment of the present invention, the first end portion of the first housing portion extending into the second fluid cavity region extends into the second housing portion, the annular gap, disposed between the first and second housing portions. The first end portion of the first housing portion extending into the second fluid cavity region may be disposed proximate the flexible bladder and has holes.

In one embodiment of the present invention, the master cylinder assembly further includes a first seal disposed on the piston or a wall of the fluid cavity. The first seal is configured to be in sealing engagement between the fluid cavity wall and the piston with the piston in the closed fluid circuit position to block fluid flow between the first and second fluid cavity regions. The first seal is configured to be in non-sealing disengagement between the fluid cavity wall and the piston with the piston in the open fluid circuit position to permit fluid flow between the first and second fluid cavity regions. The piston is slidably displaced between the open fluid circuit position in the second fluid cavity region having a second cross-sectional area and a first cross-sectional area, the second cross-sectional area being greater than the first cross-sectional area. The piston may be biased toward the open fluid circuit position. The fluid cavity may include a tapered transitional region connecting the first and second fluid cavity regions. The first housing portion may include the first fluid cavity, the tapered transitional region and a portion of the second fluid cavity having a third cross-sectional area smaller than the second cross-sectional area and greater than the first cross-sectional area.

In one embodiment of the present invention, the master cylinder assembly further includes a sealingly-separating member and the chamber includes an air cavity. The sealingly-separating member separates the air cavity from the fluid cavity. At least a portion of the sealingly-separating member is attached to and displaced with the piston. The sealingly-separating member may be a flexible bladder having a first end attached to a first portion of the piston and a second end attached to a second portion of the piston.

In one embodiment of the present invention, the master cylinder assembly further includes an adjuster operatively connected to the housing to adjust a length of the fluid cavity. The first and second housing portions are displaceable relative to each other upon actuation of the adjuster to adjust the length of the fluid cavity to vary a distance the piston displaces between a rest position and an initial closed circuit position. The adjuster may include a rotatable sleeve threadably connected to the second housing portion and rotatably connected to the first housing portion.

These and other features and advantages of the present invention will be more fully understood from the following description of one or more embodiments of the invention, taken together with the accompanying drawings.

DETAILED DESCRIPTION

Figure 1:
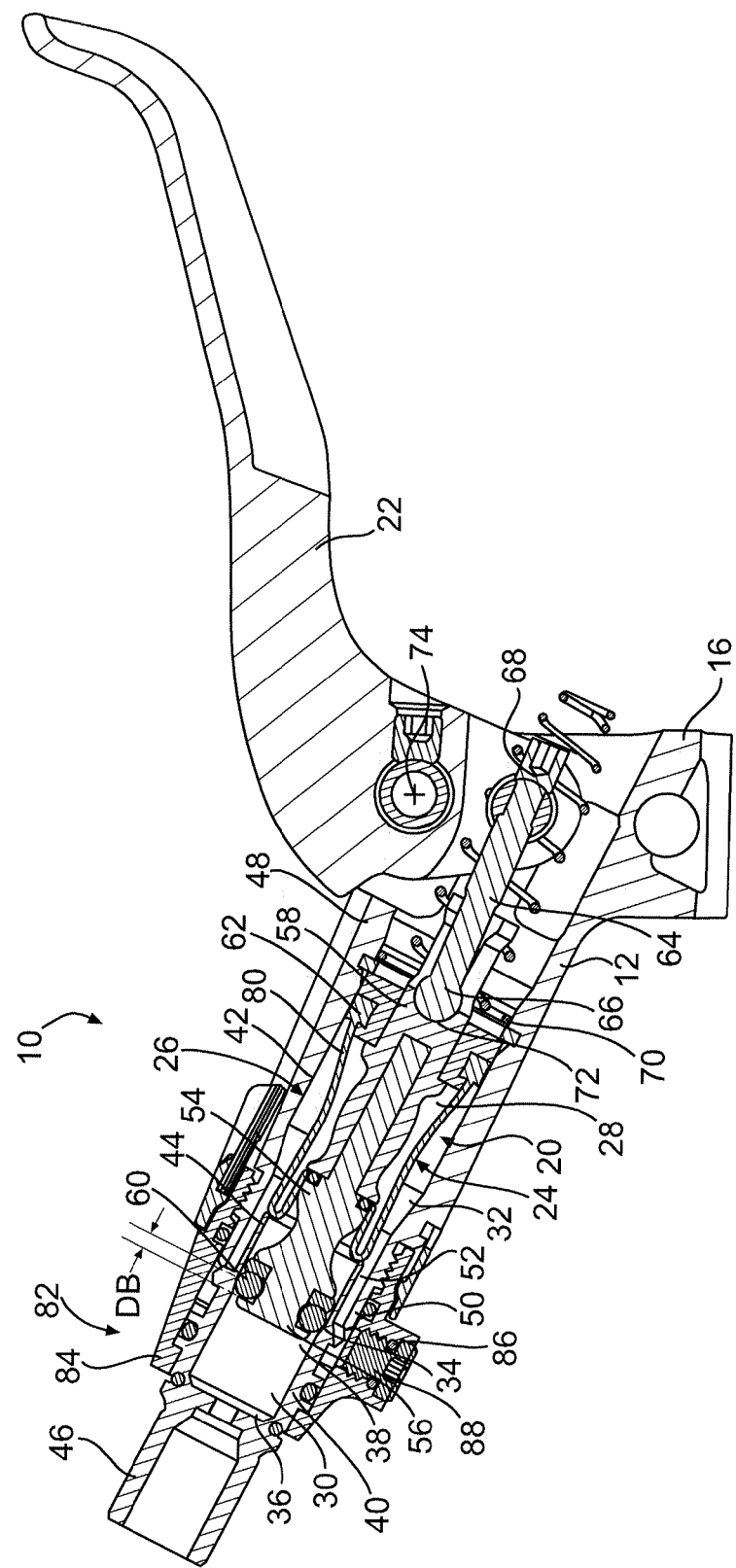
FIG. 1 is a cross-sectional view of a master cylinder assembly showing a piston in an open fluid circuit position according to one embodiment of the present invention.

FIGS. 1-4 illustrate a master cylinder assembly 10 according to one embodiment of the present invention. The master cylinder assembly 10 includes a housing 12 mountable to a frame member of the handlebar-steered vehicle, in this embodiment, to a handlebar with a clamp 16. The master cylinder assembly 10 is operatively connected to a slave cylinder assembly (not shown) by a hydraulic line to operate the hydraulic actuation system. In this embodiment, the master cylinder assembly 10 is designed to be used with a bicycle hydraulic brake system but may be adapted for use with a clutch system or the like. The master cylinder assembly 10 generally includes the housing 12 having a fluid cavity 20, an actuator 22 and a piston assembly 24.

The housing 12 includes a chamber 26 that includes the fluid cavity 20 and an air cavity 28. The fluid cavity 20 includes first and second fluid cavity regions 30, 32 and a tapered transitional region 34 therebetween. In the embodiment shown, the first fluid cavity region 30 has a smaller cross-sectional area than a cross-sectional area of the second fluid cavity region 32. One end 36 of the first fluid cavity region 30 is in fluid communication with the hydraulic line and the other end 38 is adjacent the tapered transitional region 34 of the fluid cavity 20. In this embodiment, the transitional region 34 is tapered but may have a different shape or may be eliminated entirely, for example, by a stepped transition between first and second regions. The first and second fluid cavity regions 30, 32, in this embodiment are cylindrical, however, the regions may form a variety of shapes.

The housing 12 includes discrete first and second housing portions 40, 42 having first and second end portions 44, 46, 48, 50. The first end portion 44 of the first housing portion 40 extends axially into the second fluid cavity region 32. The first end portion 44 of the first housing portion 40 has a smaller diameter than the second end portion 50 of the second housing portion 42 allowing it to extend into the second housing portion 42, thereby creating an annular gap 52 between the first and second housing portions 40, 42 where the two housing portions 40, 42 overlap. The first end portion 44 extending into the second fluid cavity may have holes to allow fluid flow. The second end portion 46 of the first housing portion 40 is connected to the hydraulic line. The first housing portion 40 includes the first fluid cavity region 30, the tapered transitional region 34 and a portion of the second fluid cavity region 32. The second housing portion 42 includes a portion of the second fluid cavity region 32.

The hydraulic fluid in the second fluid cavity region 32 may have air bubbles that may move around in the master cylinder assembly 10 when it changes positions. If the air bubbles move into the first fluid cavity region 30 before the first fluid cavity region 30 is pressurized, the air bubbles may affect brake performance. The annular gap 52 of the present invention captures the air bubbles in the second fluid cavity region 32 by redirecting the air bubbles into the gap 52 between the first and second housing portions 40, 42 before they pass into the first fluid cavity region 30. Also, the cross-sectional area of the second fluid cavity region 32 is reduced before the transitional region 34 which also reduces the possibility of air bubbles passing into the first fluid cavity region 30.

Figure 5:
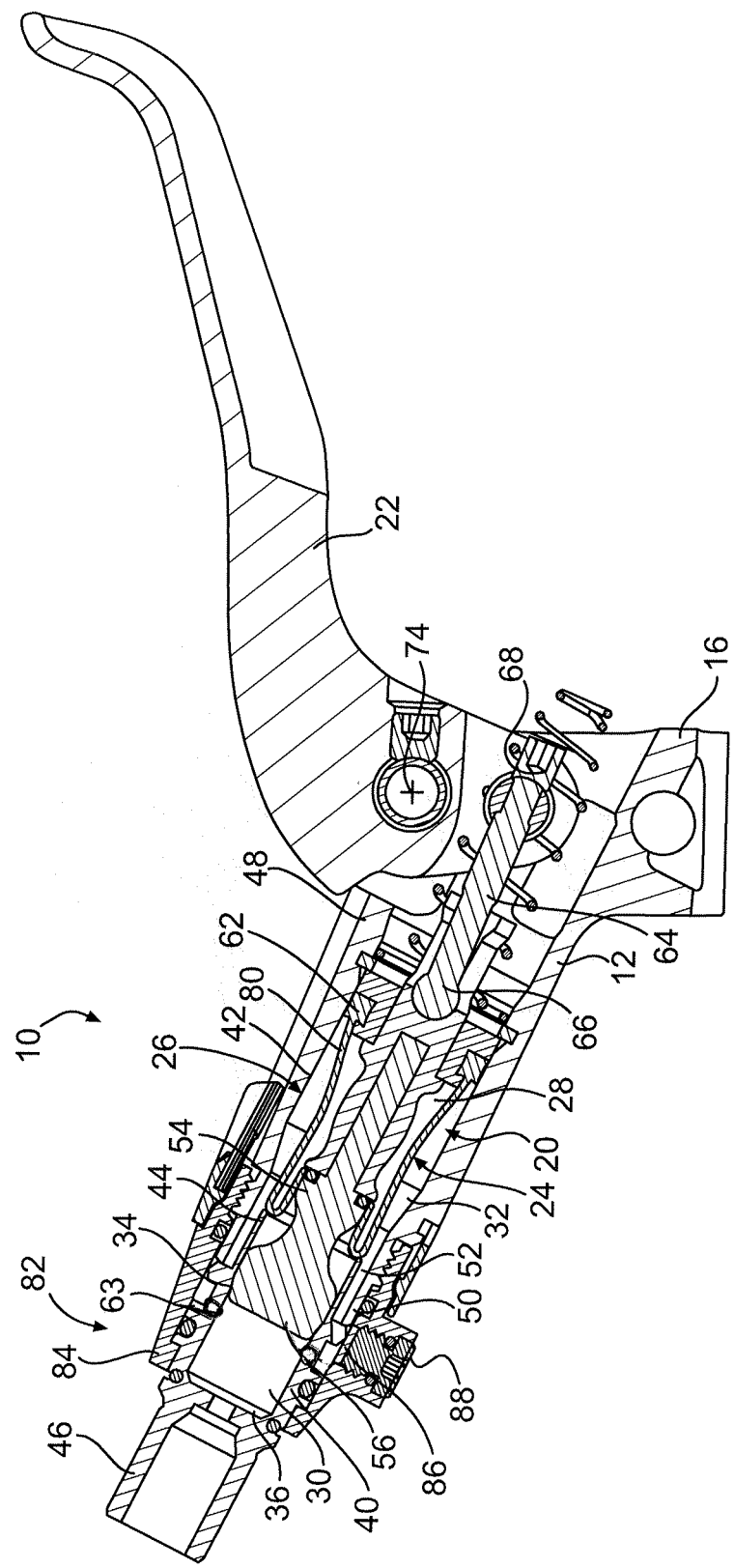
FIG. 5 is a cross-sectional view of a master cylinder assembly according to another embodiment of the present invention.

The piston assembly 24 includes a piston 54 that is slidably disposed within the fluid cavity 20 and has first and second portions 56, 58. The piston 54 is slidably displaceable between an open fluid circuit position that permits fluid flow between the first and second fluid cavity regions, and a closed fluid circuit position that blocks fluid flow between the first and second fluid cavity regions 30, 32. The distance the piston 54 slides between its rest position, corresponding to an actuator rest position, and the initial closed fluid circuit position is referred to as the dead band. A first seal 60, in this embodiment an O-ring, is disposed on the first portion 56 of the piston 54 and a second seal 62 is disposed on the second portion 58 of the piston 54. Alternatively, in another embodiment, a first seal 63 may be disposed on a wall of the fluid cavity 20 (see FIG. 5) instead of on the piston 54. A pushrod 64 is connected to the second portion 58 of the piston 54. One end 66 of the pushrod 64 includes a ball surface 70 received in a corresponding cup surface 72 in the second portion 58 of the piston 54. The other end 68 of the push rod 64 is connected to the actuator 22, in this embodiment, a lever pivotably connected to the housing 12 about a pivot axis 74. The actuator 22 is movable between a rest position and an actuated position.

A sealingly-separating member, in this embodiment, a flexible bladder 80 surrounds a portion of the piston 54. One end of the bladder 80 is attached to the first portion 56 of the piston 54 and is disposed proximate the first end portion 44 of the first housing portion 40. The flexible bladder 80 sealingly separates the air cavity 28 from the fluid cavity 20. In this embodiment, the second seal 62 and the other end of the bladder 80 are a single piece.

Figure 4:
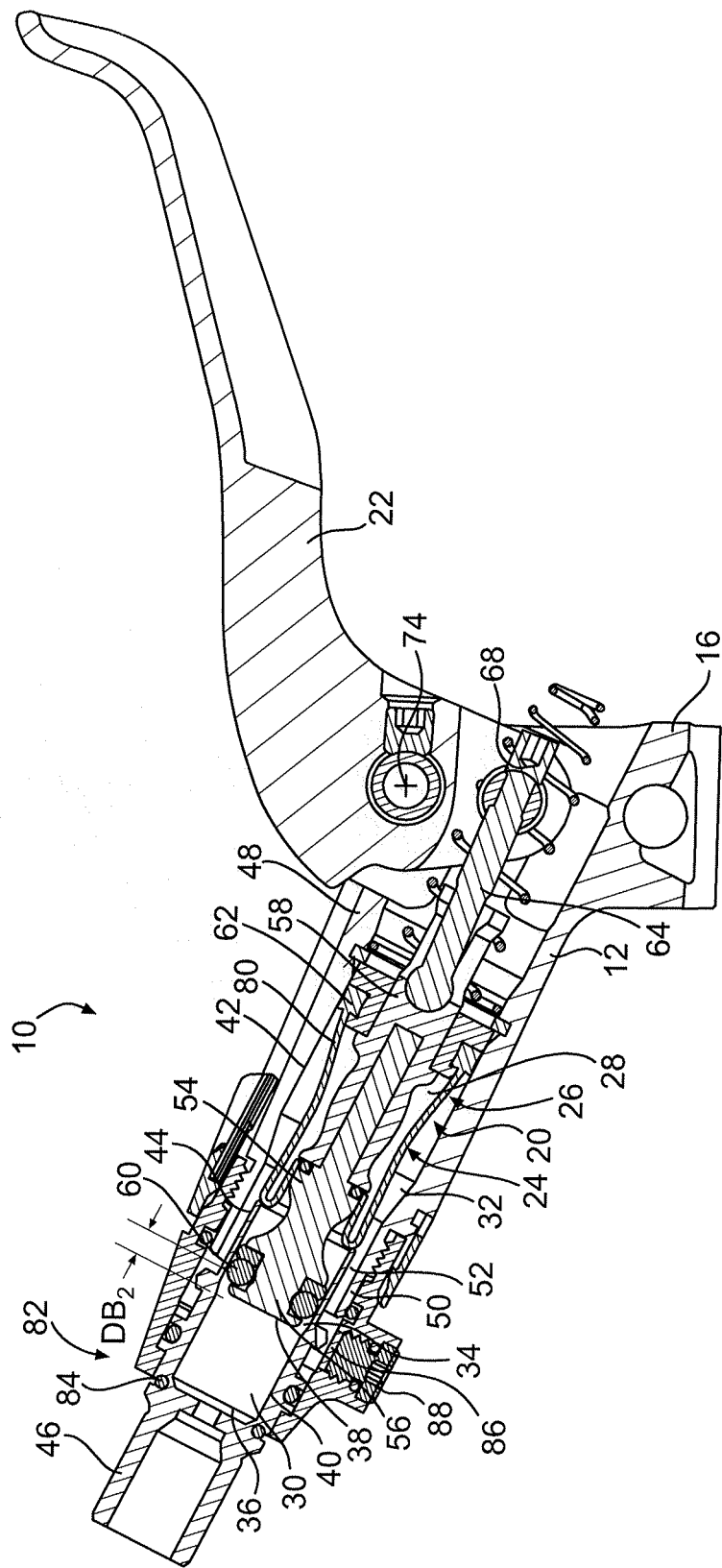
FIG. 4 is a cross-sectional view of the master cylinder assembly of FIG. 1 showing a fluid cavity having a different length than the fluid cavity of FIGS. 1 and 2.

An adjuster 82 is operatively connected to the housing 12 to adjust a length of the fluid cavity 20. The adjuster 82 includes a rotatable sleeve 84 rotatably connected to the first housing portion 40 of the housing 12 permitting rotation of the sleeve 84 relative to the first housing portion 40. The sleeve 84 includes threads cooperatively engaging threads disposed on the second housing portion 42. To adjust the length of the fluid cavity 20, the sleeve 84 is rotated, causing the first housing portion 40 to displace toward or away from the second housing portion 42. By adjusting the length of the fluid cavity 20, the dead band or the distance the piston 54 must slide between its rest position and the initial closed fluid circuit position is adjusted. FIG. 1 shows a first dead band $DB_1$ and FIG. 4 shows a second dead band $DB_2$. The rotatable sleeve 84 includes a fill hole 86 for filling the fluid cavity 20 with fluid. A screw 88 is threaded into the fill hole 86. In another embodiment of the present invention, the adjuster 82 may be eliminated and the first housing portion 40 may be pressed fit into the second housing portion 42 or the first housing portion 40 and the second housing portion 42 may be formed as one-piece.

Looking to FIG. 1, the actuator 22 is shown in a rest position with the first seal 60 in non-sealing disengagement between the fluid cavity wall and the piston 54 with the piston 54 in the open fluid circuit position to permit fluid flow between the first and second fluid cavity regions 30, 32. For the first seal 60 to be in non-sealing disengagement, the first seal 60 need not be disengaged from both the fluid cavity wall and the piston 54.

Figure 2:
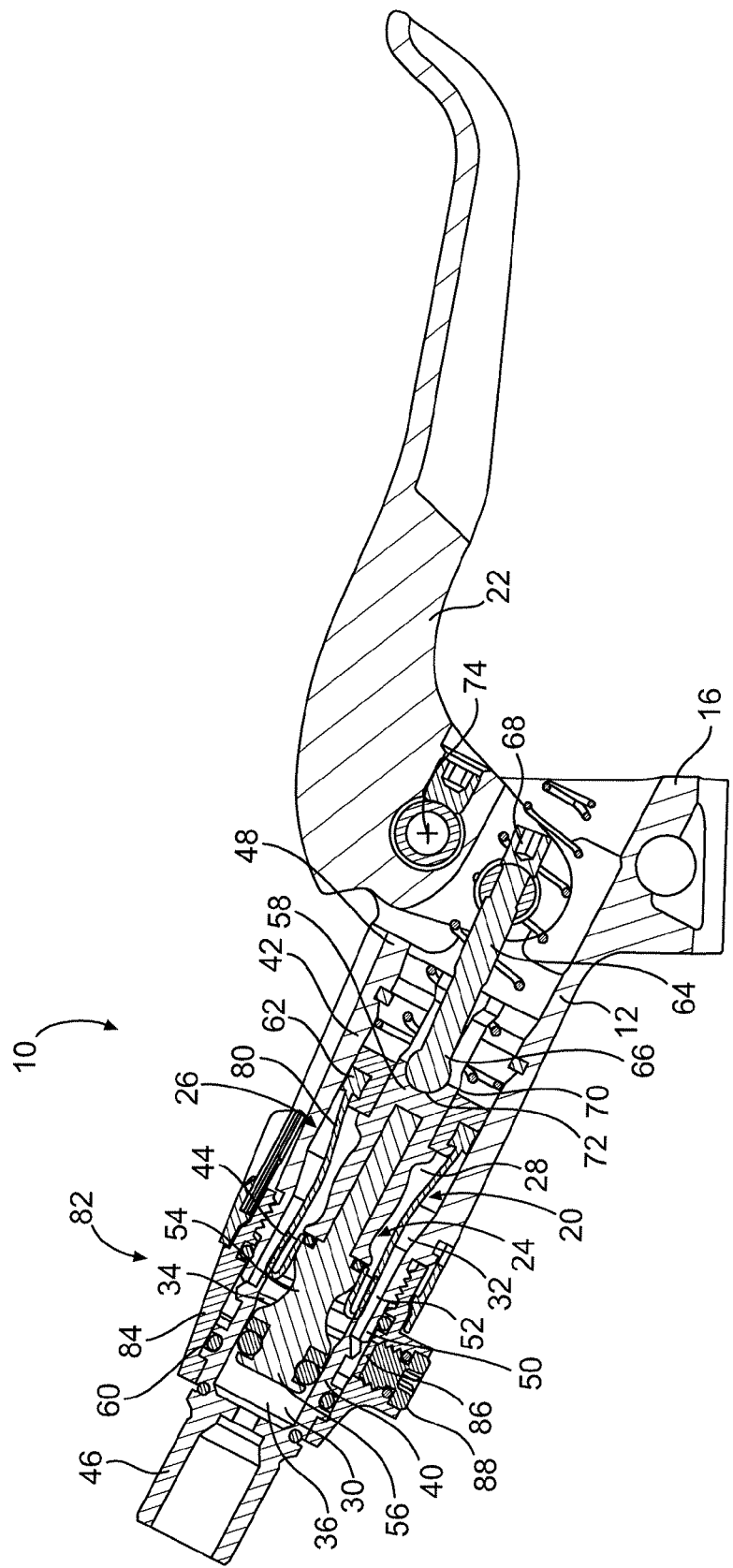
FIG. 2 is a cross-sectional view of the master cylinder assembly of FIG. 1 showing the piston in a closed fluid circuit position.
Figure 3:
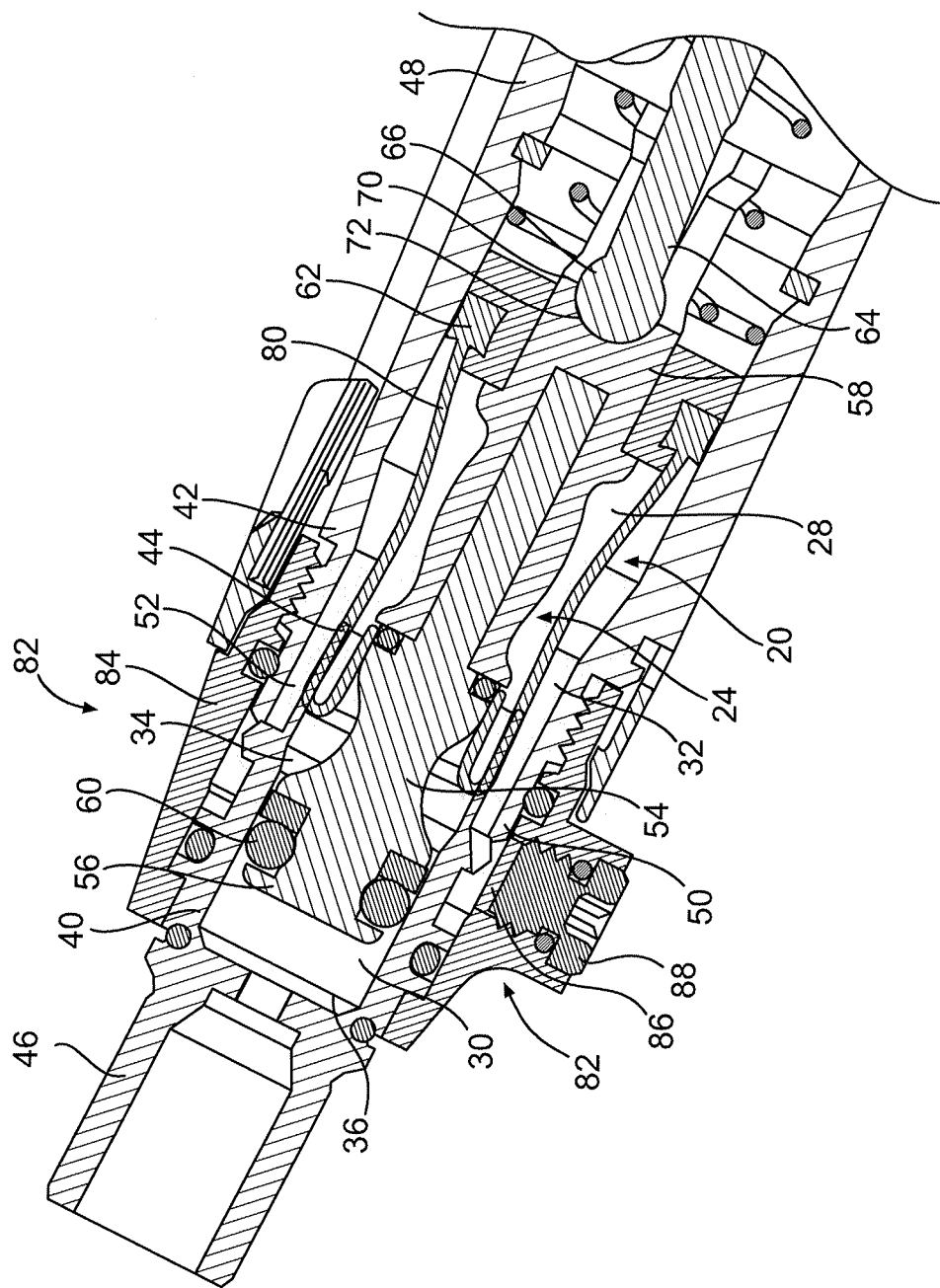
FIG. 3 is an enlarged cross-sectional view of a portion of the master cylinder assembly of FIG. 2.

Looking to FIGS. 2 and 3, as the actuator 22 is pivoted toward the clamp 16, the pushrod 64 is driven toward the first fluid cavity region 30, which in turn, causes the piston 54 to slidably displace toward the first fluid cavity region 30. As the piston 54 slidably displaces toward the first fluid cavity region 30, the first seal 60 sealingly engages between the wall of the first fluid cavity region 30 and the piston 54 thereby closing the fluid circuit to block fluid between the first and second fluid cavity regions 30, 32. This blockage builds pressure in the first fluid cavity region 30, and in turn, pressurizes fluid within the hydraulic line 18 resulting in actuation of the slave cylinder assembly (not shown) of the hydraulic brake system. In this embodiment, the first seal 60 is alternatively deformed and undeformed to provide sealing engagement and non-sealing disengagement, respectively, between the wall of the first fluid cavity region 30 and the piston 54. As the actuator 22 is further actuated, the pressure in the first fluid cavity region 30 increases, resulting in increased braking force. When the actuator 22 is released, the piston 54 returns to the open fluid circuit position, the first seal 60 disengaging the wall of the first fluid cavity region 30 to permit fluid flow between the first and second fluid cavity regions 30, 32 thereby equalizing pressure throughout the fluid cavity 20.

While this invention has been described by reference to one or more embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed:

1. A master cylinder assembly for a hydraulic actuation system for a handlebar-steered vehicle, the master cylinder assembly comprising:

a housing mountable to a frame member of the handlebar-steered vehicle and having a chamber including a fluid cavity with first and second fluid cavity regions, the first fluid cavity region being in fluid communication with the hydraulic actuation system, the housing including discrete first and second housing portions, the first housing portion having first and second end portions, the first end portion of the first housing portion extending axially into the second fluid cavity region creating an annular gap radially outboard of the first end portion extending into the second fluid cavity region, the second end portion of the first housing portion connected to the hydraulic actuation system;

a piston assembly including a piston slidably disposed within the fluid cavity; and an actuator operatively connected to the housing and operatively connected to the piston to slidably displace the piston between an open fluid circuit position permitting fluid flow between the first and second fluid cavity regions and a closed fluid circuit position blocking fluid flow between the first and second fluid cavity regions.

2. The master cylinder assembly of claim 1, wherein the first end portion of the first housing portion extending into the second fluid cavity region extends into the second housing portion, the annular gap disposed between the first and second housing portions.

3. The master cylinder assembly of claim 1, further comprising a first seal disposed on one of the piston and a wall of the fluid cavity, the first seal configured to be in sealing engagement between the fluid cavity wall and the piston with the piston in the closed fluid circuit position to block fluid flow between the first and second fluid cavity regions, the first seal configured to be in non-sealing disengagement between the fluid cavity wall and the piston with the piston in the open fluid circuit position to permit fluid flow between the first and second fluid cavity regions.

4. The master cylinder assembly of claim 3, wherein the piston is slidably displaced between the open fluid circuit position in the second fluid cavity region having a second cross-sectional area and a closed fluid circuit position in the first fluid cavity region having a first cross-sectional area, the second cross-sectional area being greater than the first cross-sectional area.

5. The master cylinder assembly of claim 4, wherein the first seal is configured to be deformed in sealing engagement between the fluid cavity wall and the piston with the piston in the closed fluid circuit position, the first seal configured to be undeformed in non-sealing disengagement between the fluid cavity wall and the piston with the piston in the open fluid circuit position.

6. The master cylinder assembly of claim 5, wherein the fluid cavity includes a tapered transitional region connecting the first and second fluid cavity regions.

7. The master cylinder assembly of claim 6, wherein the first housing portion includes the first fluid cavity, the tapered transitional region and a portion of the second fluid cavity region having a third cross-sectional area smaller than the second cross-sectional area and greater than the first cross-sectional area.

8. The master cylinder assembly of claim 7, further comprising a sealingly-separating member and the chamber includes an air cavity, the sealingly-separating member separating the air cavity from the fluid cavity, at least a portion of the sealingly-separating member attached to and displaced with the piston.

9. The master cylinder assembly of claim 8, wherein the sealingly-separating member is a flexible bladder having a first end attached to the first portion of the piston and a second end attached to the second portion of the piston.

10. The master cylinder assembly of claim 9, further comprising an adjuster operatively connected to the housing to adjust a length of the fluid cavity.

11. The master cylinder assembly of claim 10, wherein the first and second housing portions are displaceable relative to each other upon actuation of the adjuster to adjust the length of the fluid cavity to vary a distance the piston displaces between a rest position and an initial closed circuit position.

12. The master cylinder assembly of claim 11, wherein the adjuster includes a rotatable sleeve threadably connected to the second housing portion and rotatably connected to the first housing portion.

13. The master cylinder assembly of claim 12, wherein the piston is biased toward the open fluid circuit position.

14. The master cylinder assembly of claim 13, wherein the actuator is a lever pivotably attached to the housing and the frame member is a handlebar.

15. The master cylinder assembly of claim 14, wherein the first end portion of the first housing portion extending into the second fluid cavity is disposed proximate the flexible bladder.

16. The master cylinder assembly of claim 15, wherein the first end portion of the first housing portion extending into the second fluid cavity has holes.

17. The master cylinder assembly of claim 1, wherein the actuator is a lever pivotably attached to the housing and the frame member is a handlebar.

18. The master cylinder assembly of claim 1, further comprising an adjuster operatively connected to the housing to adjust a length of the fluid cavity.

19. The master cylinder assembly of claim 18, wherein the first and second housing portions are displaceable relative to each other upon actuation of the adjuster to adjust the length of the fluid cavity to vary a distance the piston displaces between a rest position and an initial closed circuit position.

20. The master cylinder assembly of claim 19, wherein the adjuster includes a rotatable sleeve threadably connected to the second housing portion and rotatably connected to the first housing portion.

21. The master cylinder assembly of claim 1, further comprising a sealingly-separating member and the chamber includes an air cavity, the sealingly-separating member separating the air cavity from the fluid cavity, at least a portion of the sealing-separating member attached to and displaced with the piston.

22. The master cylinder assembly of claim 21, wherein the sealingly-separating member is a flexible bladder having a first end attached to the first portion of the piston and a second end attached to the second portion of the piston.

23. A master cylinder assembly for a hydraulic actuation system for a handlebar-steered vehicle, the master cylinder assembly comprising:

housing means for mounting the master cylinder assembly to a frame member of the handlebar-steered vehicle and having a chamber including a fluid cavity with first and second fluid cavity regions, the first fluid cavity region being in fluid communication with the hydraulic actuation system, the housing means including discrete first and second housing portions, the first housing portion having first and second end portions, the first end portion of the first housing portion extending axially into the second fluid cavity region creating an annular gap radially outboard of the first end portion extending into the second fluid cavity region, the second end portion of the first housing portion connected to the hydraulic actuation system;

a piston assembly, including a piston slidably disposed within the fluid cavity; and actuator means for slidably displace the piston between an open fluid circuit position permitting fluid flow between the first and second fluid cavity regions and a closed fluid circuit position blocking fluid flow between the first and second fluid cavity regions.

24. The master cylinder assembly of claim 23, wherein the first end portion of the first housing portion extending into the second fluid cavity region extends into the second housing portion, the annular gap disposed between the first and second housing portions.

\* \* \* \* \*